United States Patent [19]

Tanabe et al.

[11] Patent Number: 4,945,216
[45] Date of Patent: Jul. 31, 1990

[54] WIRELESS BAR CODE READER

[75] Inventors: Takeshi Tanabe, Higashi Osaka; Kenzi Ide; Mituo Ohouchi, both of Nara, all of Japan

[73] Assignee: Sharp Kabushiki Kaisha, Osaka, Japan

[21] Appl. No.: 395,203

[22] Filed: Aug. 16, 1989

Related U.S. Application Data

[63] Continuation of Ser. No. 308,962, Feb. 9, 1989, abandoned, which is a continuation of Ser. No. 855,087, Apr. 22, 1986, abandoned.

[30] Foreign Application Priority Data

| Nov. 6, 1985 | [JP] | Japan | 60-171615 |
| Nov. 6, 1985 | [JP] | Japan | 60-171616 |
| Nov. 6, 1985 | [JP] | Japan | 60-171617 |
| Nov. 12, 1985 | [JP] | Japan | 60-174478 |

[51] Int. Cl.⁵ .................... G06K 9/18; G06F 15/20
[52] U.S. Cl. .................... 235/462; 235/375; 235/472; 455/603
[58] Field of Search ........... 235/375, 439, 454, 462, 235/472; 364/400, 401, 477; 455/603, 600, 617, 128

[56] References Cited

U.S. PATENT DOCUMENTS

| 3,826,900 | 7/1974 | Moellering | 235/472 |
| 4,218,681 | 8/1980 | Hörmann | 455/603 |
| 4,323,773 | 4/1982 | Carpenter | 235/375 |
| 4,415,065 | 11/1983 | Sandstedt | 364/401 |
| 4,450,319 | 5/1984 | Lucey | 455/603 |
| 4,465,926 | 8/1984 | Apitz et al. | 235/454 |
| 4,471,218 | 9/1984 | Culp | 235/454 |
| 4,654,514 | 3/1987 | Watson | 235/472 |

FOREIGN PATENT DOCUMENTS 2368096  6/1978  France ................. 455/603

Primary Examiner—Vincent P. Canney
Assistant Examiner—Robert A. Weinhardt
Attorney, Agent, or Firm—Flehr, Hohbach, Test, Albritton & Herbert

[57] ABSTRACT

A wireless bar code reader, which simplifies the setting and operation of a microwave oven, comprises a scanning unit for reading bar codes in a cookbook and a transmitting unit for transmitting to the control unit of the microwave oven a bar code signal indicative of the information related to the bar code read by the scanning unit. A secondary battery serves as its power source and a jack for charging it is disposed on the same side of the reader as the scanning unit. The transmitting unit is disposed at the opposite end. The reading and transmitting units are either in both perpendicular and parallel directivity relationship or simply in perpendicular relationship to each other.

5 Claims, 2 Drawing Sheets

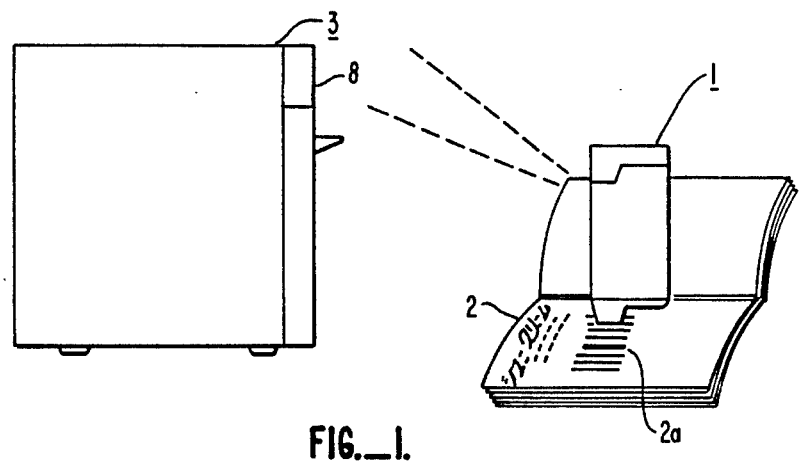
FIG._1.
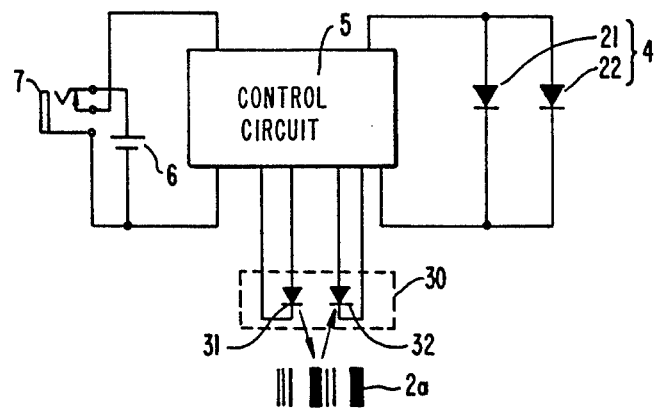
FIG._2.
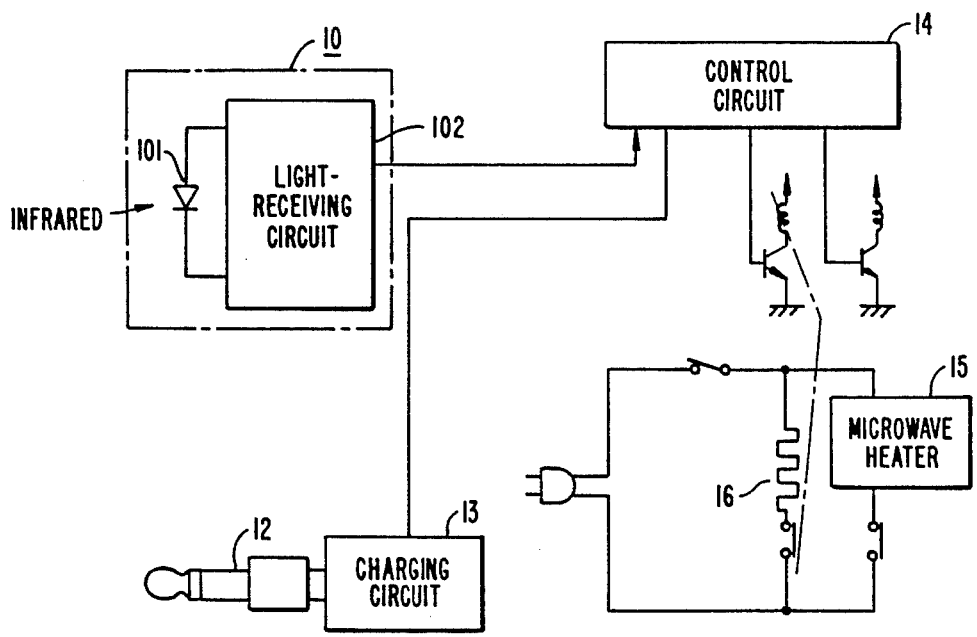
FIG._3.

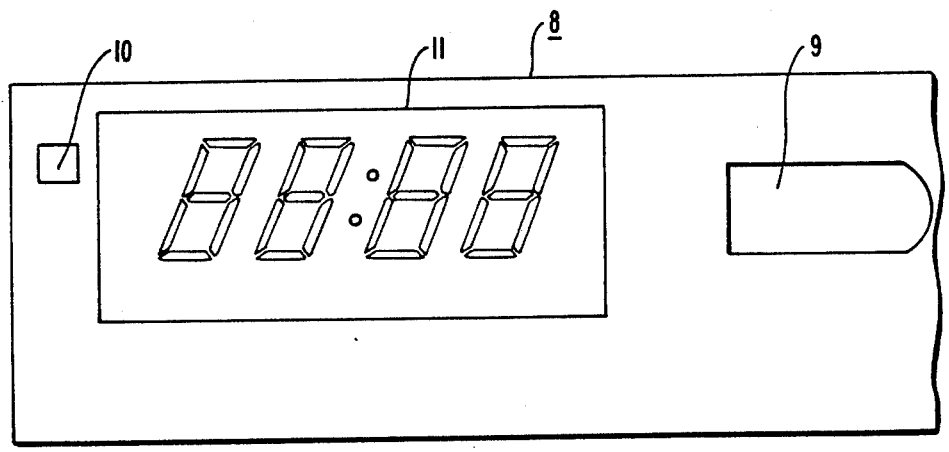
FIG._4.
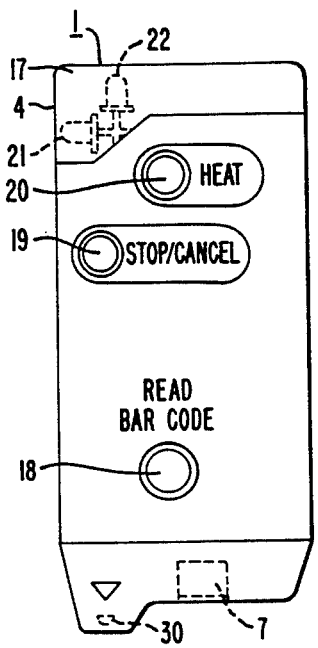 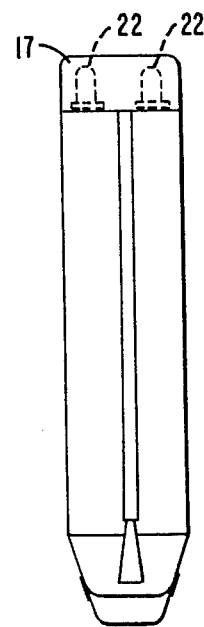
FIG._5a. FIG._5b.
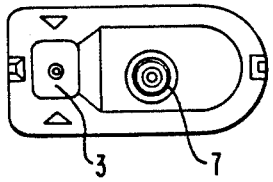
FIG._5c.

WIRELESS BAR CODE READER

This is a continuation of application Ser. No. 308,962 filed Feb. 9, 1989, now abandoned, which is a continuation of application Ser. No. 855,087 filed Apr. 22, 1986, now abandoned.

This invention relates to the structure of a wireless bar code reader.

With the wide spread of microcomputers and sensors in recent years, cooking devices, and microwave ovens in particular, are quickly becoming multi-functional, having a large number of keys displayed on the operator's panel. For example, there are all kinds of menu keys for automatic heating and also many keys for manual control such as "high", "medium", "low", "grill", "convection", etc. It is extremely troublesome for a user to operate and set these keys (for heating time and temperature) according to individual menus. Errors in operation and setting are therefore very common.

In view of the situation above, there has been proposed a convenient new type of microwave ovens which can be set according to a menu by using a bar code reader to read out various information such as the time of heating, temperature, heating output and sensor detection level for each stage of heating written in the bar code and listed in a cookbook belonging to the microwave oven. The bar code reader is not useful, however, if it must be connected to the housing of the microwave oven by wires. Various problems have been encountered, however, in the attempt to provide wireless bar code readers.

It is therefore an object of the present invention to provide a wireless bar code reader having at one end a scanning unit for reading a bar code and at the other end a transmitting unit for transmitting to the control means for the oven a bar code signal indicative of whatever information which is inputted through the scanning unit.

It is another object of the present invention to provide such a wireless bar code reader with a rational directivity relationship between the scanning and transmitting units.

It is a further object of the present invention to provide a wireless bar code reader using a secondary battery as power source and having a jack for charging it conveniently disposed with respect to the scanning unit.

The above and other objects of the present invention are attained by providing a wireless bar code reader which significantly simplifies the setting of keys and the operation of a microwave oven. Such a wireless bar code reader comprises a scanning unit for reading bar codes in a cookbook especially prepared for the microwave oven and a transmitting unit for transmitting to the control unit of the microwave oven a bar code signal indicative of the information related to the bar code which has been read by the scanning unit. A secondary battery serves as its power source and a jack for charging it is disposed on the same side of the bar code reader as the scanning unit. The transmitting unit is disposed a the opposite end. The scanning and transmitting units are either in both perpendicular and parallel directivity relationship or simply in perpendicular relationship to each other.

The accompanying drawings, which are incorporated in and form a part of the specification, illustrate embodiments of the present invention and, together with the description, serve to explain the principles of the invention. In the drawings:

FIG. 1 schematically shows a microwave oven making use of a wireless bar code reader of the present invention, FIG. 2 is a circuit diagram of a wireless bar code reader, FIG. 3 is a circuit diagram of a microwave oven which operates with the wireless bar code reader of FIG. 2, FIG. 4 is a front view of the operation panel on the microwave oven of FIG. 3, and FIGS. 5(a), 5(b) and 5(c) are a front view, a right-hand side view and a bottom view of the wireless bar code reader of the present invention.

With reference to FIG. 1, numeral 1 generally indicates a wireless bar code reader of the present invention having the function of reading a bar code 2a printed in a cookbook 2 and transmitting to a control unit 3 of a microwave oven an electromagnetic signal indicative of the information represented by the bar code 2a.

As shown in FIG. 2, the wireless bar code reader 1 includes a scanning unit 30 for irradiating a bar code 2a with a light beam emitted from a light-emitting diode 31 and reading it by detecting a reflected beam by means of a light-receiving diode 32, a transmitting unit 4 for transmitting the inputted bar code information by an infrared beam, a control circuit 5 which controls the above, a secondary battery 6 as the source of power and a jack 7 for charging this secondary battery 6. The reason for using a secondary battery as the source of power for the wireless bar code reader is that a strong current is needed to operate an infrared light-emitting diode and the amount of bar code information to be transmitted to the microwave oven is enormous. A strong current will be needed over an extended period of time and the consumption rate of ordinary cells would become significantly high.

On the operation panel 8 of the microwave oven control unit 3, there are a storage box 9 for storing the wireless bar code reader 1 and a signal receiving section 10 for receiving bar code signals transmitted from the reader 1 as shown in FIG. 4 adjacent to a display tube 11. Deep inside the storage box 9, there is a plug 12 connected to a charging circuit 13 as shown in FIG. 3 such that the jack 7 becomes connected to the plug 13 if the reader 1 is inserted properly into the storage box 9.

FIG. 3 also shows that the aforementioned signal receiving section 10 includes a photodiode 101 for receiving the infrared light signal from the reader 1 and a light-receiving circuit 102, and outputs the received bar code signal to a control circuit 14. The control circuit 14 is adapted to control a microwave heating device 15 and/or an ordinary heater means 16 according to the heating program inputted from the signal receiving section 10.

The reader 1 according to the present invention has the scanning unit 30 and the charging jack 7 on the same side as shown in FIG. 5 with the scanning unit 30 protruding somewhat from the jack 7 for making the scanning operation easier. The transmitting unit 4 is located on the opposite side of the reader 1 where infrared light-emitting diodes 21 and 22 are mounted in mutually perpendicular directivity relationship and are both covered by a filter 17. When the reader 1 is inserted into the storage box 9, therefore, only the filter 17 will be visible. The infrared light-emitting diodes 21 are in perpendicular directivity relationship with the scanning unit 30. This is because the cookbook 2 is usually in a horizontal position, either being placed on a table or being held by hand, when a bar code 2a therein is scanned and reader 1 is held perpendicularly to the surface of the book 2, or in a vertical direction. Since the microwave oven, and hence its control unit 3, is also in a vertical position, the most efficient way of transmitting signals to the signal receiving section 10 by an infrared diode with 40% less output at about ±30 degrees is to transmit the signals with directivity approximately perpendicular to the reader 1, that is, nearly perpendicularly to the scanning unit 30.

The reason for placing the infrared light-emitting diodes 22 in parallel directivity relationship with the scanning unit 30 is that remote control operations can be effected with the user's hand in a natural position for holding the reader 1. The infrared light-emitting diodes 21 and 22 are connected together so as to emit light simultaneously together at the time of reading a bar code or a remote control operation.

The reader 1 is provided with a READ BAR CODE key 18 near the bottom. There are a STOP/CANCEL key 19 and a HEAT key 20 near the top of the reader 1 at positions 3 centimeters or more above the scanning unit 30. They are placed at such high positions so as to prevent the user from touching these keys inadvertently when holding the reader 1 in hand and scanning a bar code in a book. The STOP/CANCEL key 19 and the HEAT key 20 are related to some of the indispensable functions of the microwave oven and are themselves indispensable when the reader 1 is used for a remote control operation of the microwave oven.

Next, the method of using the aforementioned reader 1 is explained. The wireless bar code reader 1 is pulled out of the microwave oven control unit 3 and held by hand. The READ BAR CODE key 18 is pressed and a bar code 2a in the cookbook 2 is scanned and read. If the HEAT key 20 is pressed thereafter, the microwave oven controls the microwave heater 15 or the ordinary heater means 16 in order to start the required heating operation. If it is desired to stop the heating in the midst and the STOP/CANCEL key 19 is pressed, the control circuit sets the microwave heater 15 or the heater means 16 in the OFF condition. Thus, the user can easily set the oven according to a selected menu merely by scanning a bar code in the cookbook therefor. It is extremely convenient also because heating can be started and ended, and the setting can be canceled without walking up to the microwave oven control unit 3.

In summary, the aforementioned objects of the present invention can be achieved by the wireless bar code reader described above. In particular, since its scanning unit does not remain exposed when the reader is inserted in the storage box to have its secondary battery charged, there is no fear of dust getting attached to it or a person touching it to cause damage. With the reading and transmitting units arranged for a rational directivity relationship between them, inputted bar code signals can be efficiently transmitted to the microwave oven control unit while the scanning unit reads a bar code, and remote control operations of the microwave oven such as starting and stopping the heating can be effected by holding the reader in a natural position.

The foregoing description of the preferred embodiment has been presented for purposes of illustration and description. It is not intended to be exhaustive or to limit the invention to the precise form disclosed, and obviously many modifications and variations are possible in light of the above teaching. For example, the transmitter unit 4 need not contain infrared light-emitting diodes 22 mounted in parallel directivity relationship with the reading unit 30, According to such embodiment of the present invention, the transmitter unit 4 of FIGS. 2 and 5 will include only the light-emitting diode or diodes indicated by numeral 21. This is a simplified variation of the embodiment illustrated in FIGS. 2 and 5 although it is not separately shown in the drawings. The number of infrared light-emitting diodes in the transmitting unit does not limit the invention. In particular, if a plurality of infrared light-emitting diodes are circumferentially distributed, transmission can be effected in all peripheral directions. Likewise, the reader may be provided with a turnable infrared light-emitting diode such that transmission can be effected in any desired direction without changing the hand position of the user. Any such modifications and variations which may be apparent to a person skilled in the art are intended to be included within the scope of this invention.

What is claimed is:

1. A wireless bar code reader for transmitting to an electronic cooking device a signal representing a cooking routine, said bar code reader comprising
   a scanning unit for reading bar codes and a light transmitting unit for simultaneously transmitting to a separate control unit a bar code light signal indicative of information related to a bar code read by said scanning unit, said scanning unit and said light transmitting unit being disposed at opposite ends in a longitudinal direction of said wireless bar code reader, said scanning unit being adapted to receive light in said longitudinal direction to read a bar code and said light transmitting unit being adapted to transmit light substantially perpendicularly to said longitudinal direction,
   controlling means for controllably activating said scanning and light transmitting units, and
   a read button and device control buttons disposed on one side surface of said bar code reader, said read button being disposed near said scanning unit, said device control buttons being disposed near said light transmitting unit, said read button serving to cause said controlling means to activate said scanning unit to read a bar code and to simultaneously cause said light transmitting unit to transmit a bar code light signal, and each of said device control buttons serving to cause said controlling means to activate said light transmitting unit to transmit a corresponding control signal for controlling an operation of said electronic cooking device.

2. The wireless bar code reader of claim 1 which is adapted to use a secondary battery as source of power and further comprises a jack for charging said secondary battery, said jack and said scanning unit being disposed on the same side of said wireless bar code reader.

3. The wireless bar code reader of claim 1 wherein said light transmitting unit comprises light emitting diodes.

4. The wireless bar code reader of claim 1 wherein said device control buttons are separated from said scanning unit at least by 3 centimeters.

5. The wire bar code reader of claim 1 wherein said device control buttons include a heat button for causing a heating operation of said electronic cooking device and a stop button for causing said electronic cooking device to stop a heating operation.

* * * * *